United States Patent [19]

Shirai

[11] 3,728,767
[45] Apr. 24, 1973

[54] APPARATUS FOR ADJUSTING THE ALTITUDE OF A CHORD OF AN EXPANDING ROLL

[75] Inventor: Masayuki Shirai, Osaka, Japan

[73] Assignee: Yamauchi Rubber Industry Co., Ltd., Osaka, Japan

[22] Filed: Dec. 28, 1970

[21] Appl. No.: 101,815

[52] U.S. Cl. ............................................29/116 AD
[51] Int. Cl. ..............................................B21b 13/02
[58] Field of Search ....................29/116 R, 116 AD, 29/115, 113 AD; 26/63

[56] References Cited

UNITED STATES PATENTS

| | | | |
|---|---|---|---|
| 2,261,740 | 11/1941 | Makarius | 29/116 R |
| 2,689,392 | 9/1954 | Robertson | 29/113 AD |
| 2,898,662 | 8/1959 | Robertson | 29/116 AD X |
| 3,094,771 | 6/1963 | Robertson | 29/116 AD |
| 3,225,418 | 12/1965 | Fara | 29/113 AD |
| 3,500,524 | 3/1970 | Jagminas | 29/116 R |

Primary Examiner—Alfred R. Guest
Attorney—Woodhams, Blanchard & Flynn

[57] ABSTRACT

An apparatus for adjusting the altitude of the chord of a roll for expanding a strip of synthetic resin film, cloth, and metal foil, etc. comprising; a central shaft bent in an arc-shape and journaled by bearings, a plurality of eccentric bushes rotatably inserted on said shaft and axially spaced therealong and having an eccentricity successively increasing toward the center of said shaft, a plurality of sleeves wherein said bushes are inserted and disposed therein through the medium of a ball bearing, a rubber roll covering said sleeves and defining combining therewith as a unit, one of bearings wherein said central shaft is journaled being fixed and, in case of need, said shaft being allowed to rotate therein.

7 Claims, 12 Drawing Figures

Patented April 24, 1973  3,728,767

INVENTOR.
MASAYUKI SHIRAI
BY
Woodhams, Blanchard & Flynn
ATTORNEYS

Patented April 24, 1973

INVENTOR.
MASAYUKI SHIRAI

BY
Woodhams, Blanchard and Flynn
ATTORNEYS

Patented April 24, 1973

INVENTOR.
MASAYUKI SHIRAI

BY
Woodhams, Blanchard and Flynn
ATTORNEYS

INVENTOR.
MASAYUKI SHIRAI

APPARATUS FOR ADJUSTING THE ALTITUDE OF A CHORD OF AN EXPANDING ROLL

BACKGROUND OF THE INVENTION

1. Field of the Invention

The present invention relates to an apparatus for adjusting the altitude of the chord of roll for expanding a strip of synthetic resin film, cloth and metal foil, etc.

2. Description of the Prior Art

In the prior art, it was necessary to adjust, as required, the altitude of the chord, i.e., the distance between the center of a central shaft bent in an arc-shape and a line passing through the centers of said shaft at both ends thereof; however, no apparatus was really provided for the purpose.

Accordingly, it can be said that no adjustment was made for the purpose in the prior art.

SUMMARY OF THE INVENTION

An object of the present invention is to provide an apparatus for adjusting the altitude of a chord of an expanding roll characterized by a central shaft bent in an arc-shape; a plurality of eccentric bushes or disks rotatably inserted on said shaft and axially spaced therealong and having an eccentricity successively increasing toward the center of said shaft; a plurality of sleeves wherein said bushes are inserted and disposed therein through the medium of a ball bearing; and a rubber roll which covers the plurality of said sleeves and combines therewith as in one unit, said rubber roll being disposed eccentricly against said central shaft so as to provide a capability of adjusting the altitude of the chord.

Another object of the present invention is to provide an apparatus for adjusting the altitude of the chord of an expanding roll, wherein a central shaft is journaled by bearings at one end or both ends thereof rotatably and, in case of need, fixedly thereto and, in order to adjust the altitude of the chord, the center of a rubber roll is deviated by means of said eccentric bushes to be rotated against said shaft.

A further object of the present invention is to provide an apparatus for adjusting the altitude of the chord for an expanding roll, wherein a plurality of said bushes are simultaneously rotated against said central shaft by means of an adjusting means disposed on one side of said shaft in order to adjust the altitude of the chord.

A still further object of the present invention is to provide an apparatus for adjusting the altitude of the chord of an expanding roll wherein, each group of said eccentric bushes inserted on said shaft can be rotated separately from other one by a respectively adjusting means by means of dividing all bushes into a half and a half by the center of said shaft, so that each half of said rubber roll is deviated separately, in order to adjust the altitude of the chord respectively.

DETAILED DESCRIPTION OF THE INVENTION

Figure 1:
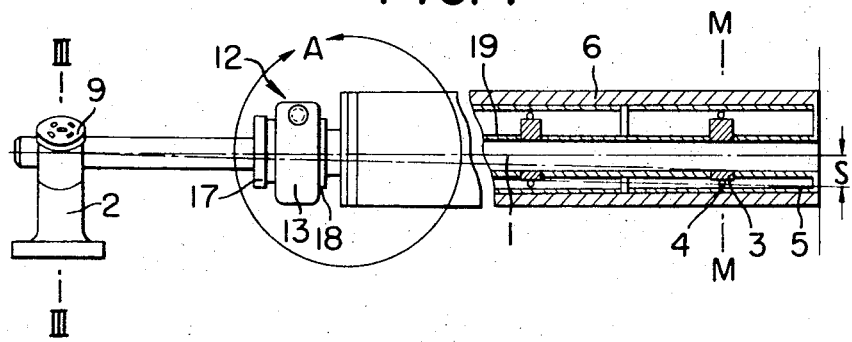
FIG. 1 is a partially sectional elevational view of the left-half of a preferred embodiment illustrating the present invention.
Figure 2:
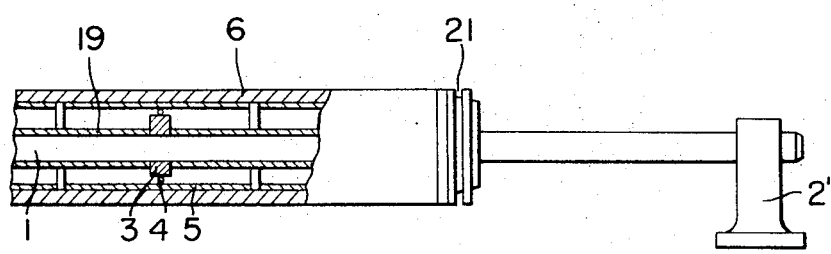
FIG. 2 is a partially sectional elevational view of the right-half of the embodiment shown in FIG. 1.
Figure 3:
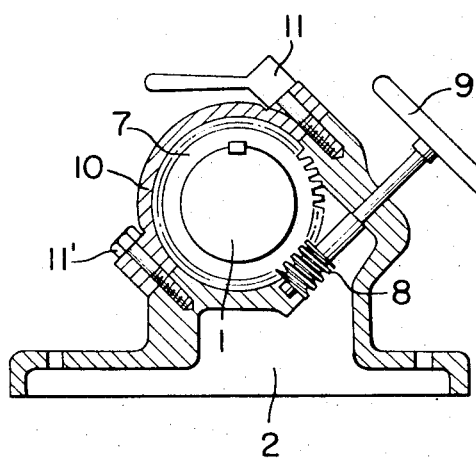
FIG. 3 is an enlarged cross-sectional view taken along the line III—III in FIG. 1.
Figure 5:
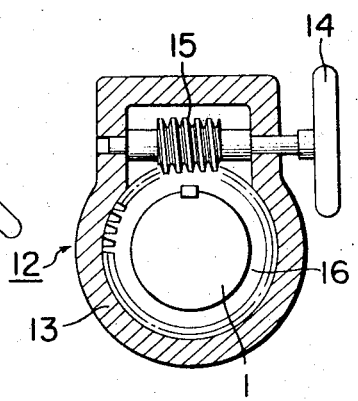
FIG. 5 is a cross-sectional view taken along the line V—V in FIG. 4.
Figure 4:
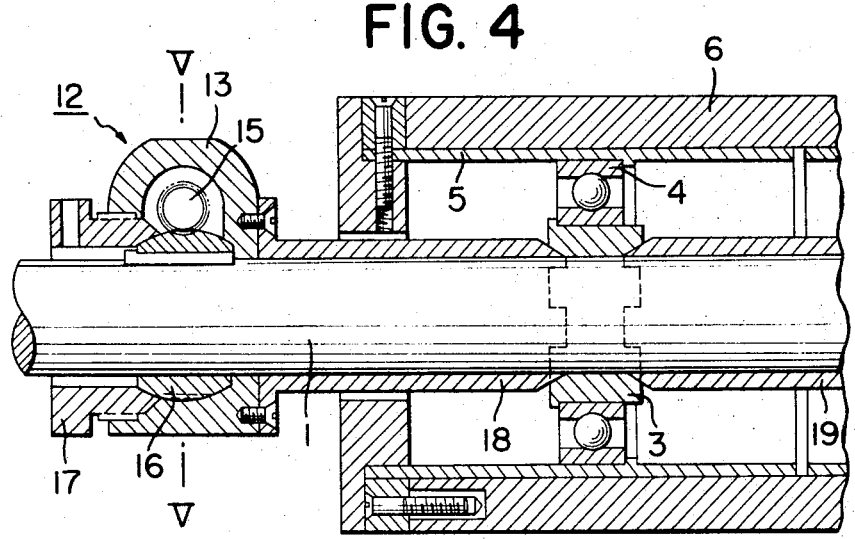
FIG. 4 is an enlarged sectional elevational view of the portion encircled by A in FIG. 1.

Referring to FIGS. 1 and 2, the numeral 1 denotes a central shaft which is journaled by bearings 2,2' and which is bent in an arc-shape having an altitude of the chord expressed by (s).

Onto said central shaft 1 are inserted a plurality of eccentric bushes or disks 3 having eccentricities which successively increase toward the midpoint of said shaft. Said bush is supported within a sleeve 5 through the medium of a ball bearing 4, and said sleeves 5 are in turn coated or covered by a rubber roll 6.

A worm gear 7 is tightly fixed to said central shaft at the journaled portion of said shaft within there said bearing 2, wherein is provided a worm 8 to engage with said worm gear.

A handle 9 is fixedly positioned on said worm axis and a cover 10 of said bearing tightly secured to a body bearing by means of bolts 11,11' while said cover presses said worm gear 7 so as to maintain said shaft 1 secured fixedly by the bearing 2.

Furthermore, onto said central shaft there is disposed an adjusting means which comprises a casing 13, a worm 15 disposed therein being provided with a handle 14 at its axis and a worm gear 16 also disposed therein engaging with said worm and concurrently fixed to the central shaft 1.

The surface of the teeth of said worm gear 16 is intentionally curved so that fixation of the worm gear to the casing 13 is loosened or tightened, as required, by means of releasing or fastening a collar 17 which is screwed into said casing.

On the other side of casing 13, a toothed coupling tube 18 is disposed fixedly thereto, and said coupling tube is inserted on the central shaft and is provided with teeth at one end thereof, so as to couple with those of the eccentric bush 3 which is located in a foremost outward position on said central shaft. All the bushes 3 are connected with each other in a unit by the teethed coupling tubes 19.

On the right-side end of a rubber roll, there is provided a groove 21 which engages with a driving belt (not shown).

Figure 6:
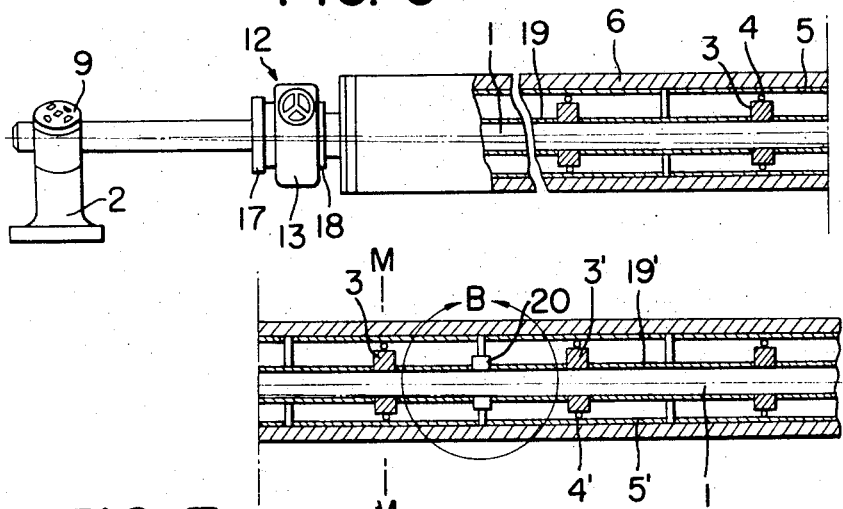
FIG. 6 is a partially sectional elevational view of the left-half of a second preferred embodiment according to the present invention.
Figure 7:
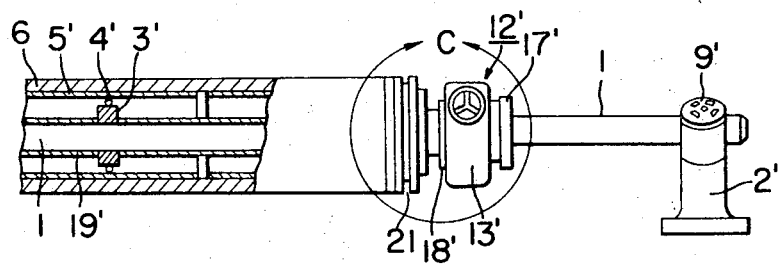
FIG. 7 is a partially sectional elevational view of the right-half of the embodiment shown in FIG. 6.
Figure 8:
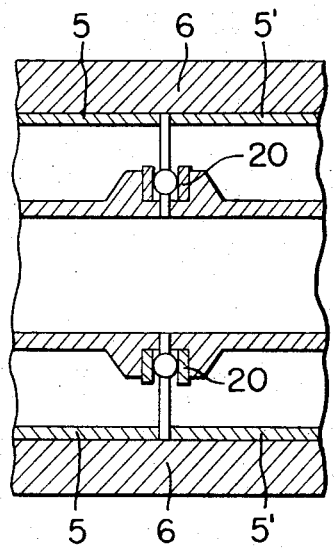
FIG. 8 is an enlarged sectional elevational view of the portion encircled by B in FIG. 6.
Figure 9:
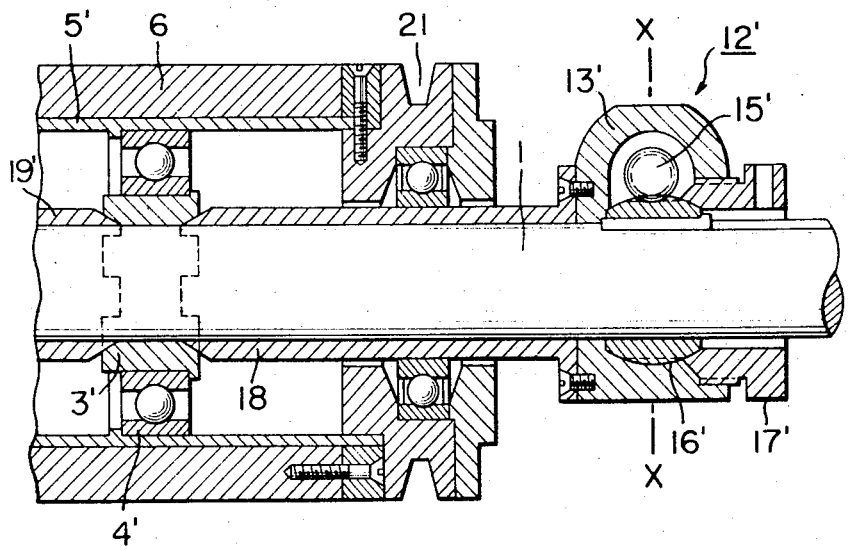
FIG. 9 is an enlarged sectional elevational view of the portion encircled by C in FIG. 7.

With respect to an alternate embodiment illustrated in FIGS. 6 and 7, a plurality of bushes 3,3' are inserted onto a central shaft 1 journaled by bearings 2,2' and said bushes have an eccentricities which successively increase from both ends to the midpoint of the shaft. Each of said bushes is disposed within a sleeve 5,5' through the medium of a ball bearing 4,4' and all the sleeves are covered by a rubber roll 6.

Each worm gear 7,7', which is disposed within said bearings 2,2' journaling the central shaft, is fixed to said shaft, and a worm 8,8' to be engaged with said worm gear is also provided within the bearing.

A handle 9,9' is fitted to said worm axis, while a cover 10,10' of the bearing 2,2' is tightly secured with the body of bearing by means of bolts 11,11' and concurrently presses said worm gear 7,7' so as to fix said central shaft tightly to the bearing 2,2'.

Each of adjusting means 12,12', which is inserted on both sides of the central shaft, includes a casing 13,13', a worm 15,15' disposed within said casing and provided with a handle 14,14' on its axis and a worm gear 16,16' engaging with said worm and concurrently being fixed to the central shaft 1.

The surface of the teeth of said worm gear is intentionally curved so that fixation thereof to the casing is loosened or tightened, as required, by way of releasing or fastening a collar 17,17' which is screwed into said casing.

On the other side of the casing, a toothed coupling tube 18,18' is disposed fixedly thereto, and said coupling tube is inserted onto the central shaft and is provided with the teeth at one end thereof, so as to couple with those of an eccentric bush 3,3' which is located in a foremost outward position on both right and left sides of said central shaft.

All the right side and the left side bushes separated from the midpoint of shaft are to be connected with each other in one unit respectively on each side by toothed coupling tubes 19,19'.

The bushes 3,3' positioned right and left adjacent to the center of the shaft are set opposed each other through the medium of a thrust bearing 20, and a groove 21 is provided on one end of a rubber roll 6 in order to lead a driving belt to engage therein.

With respect to an apparatus as above-mentioned, a further description will be made regarding how to adjust the altitude of the chord for a rubber roll with reference to FIG. 10.

If a material to be treated for expanding is intended to smooth away rumples thereon, the altitude (L) of the chord for the rubber roll 6 must be increased.

Figure 10X:
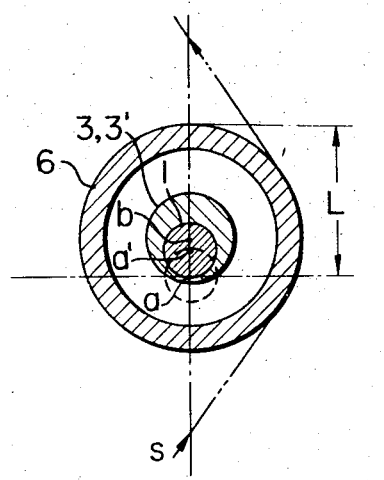
FIG. 10 is a schematic view illustrating schematically the function of a mechanism according to the present invention with figures (X), (Y), and (Z) showing a cross-section taken along the line M—M in FIG. 1 or 6, wherein the dispositions of the central shaft, the eccentric bush and the rubber-roll are shown both in a normal position and in adjusted position respectively.
Figure 10Y:
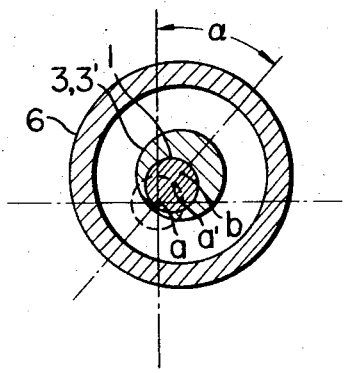
Figure 10Z:
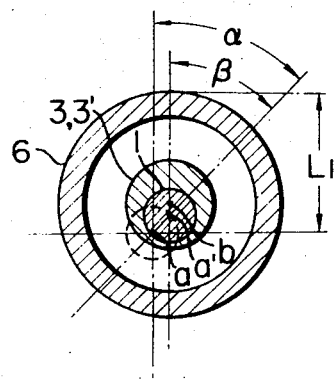

For the purpose, accordingly a roll should be set up in a normal position illustrated by FIG. 10 (X), wherein there is seen a cross-section of a rubber roll 6, a bush and the central shaft taken along the line M-M in FIGS. 1 and 6, together with another cross-section of said shaft which is taken along a line passing through the center of bearing 2 and projected onto the same cross-section as of the rubber roll, the bush, etc. with a broken line.

Further, in FIG. 10, the center of the central shaft is denoted by (a'), the center of the eccentric bush and the rubber roll by (b), and the projected center of said shaft at the center of the bearing by (a).

Thus, if the largest altitude L of the chord of the roll 6 is required, the points (a), (a') and (b) must be aligned on a line perpendicular to the axis (a) the shaft 1 as shown in FIG. 10 (X), while, if a decreased altitude of the chord is required, firstly the central shaft should be rotated relative to the bearings 2,2', so that the center of the roll is deviated to a slanted position, wherein a segment of line (a) (a') is inclined at an angle $\alpha$ relative to a perpendicular line passing through (a), and nextly the eccentric bushing is rotated in a counter direction relative to the central shaft so that a segment of line (a') (b) is slanted relative to line (a) (a') by angle $\beta$. As the result, the maximum altitude (L) is decreased to an altitude ($L_1$).

Now, a still further description will be made with respect to how to accomplish an adjusting operation against an apparatus according to the present invention.

With reference to the first preferred embodiment, the adjustment for $\alpha$ is proceeded through the successive steps of releasing a cover 10 of the bearing 2 by means of unfastening a bolt 11 of said bearing and then rotating a handle 9 so as to rotate a worm 8 and a worm gear 7 engaged with said worm and thereby cause the simultaneous rotation of central shaft 1 fixedly connected with said worm gear, adjusting means 12 fixedly connected with said shaft, toothed coupling tube 18 fixedly fitted to the casing of said adjusting means, bush 3 connected with said coupling tube 18, the other bushes 3 connected with said bush through the medium of toothed coupling tubes 19 just as in one unit, sleeves 5 wherein said bushes 3 are disposed through the medium of ball bearings 4, and a rubber roll 6 covering said sleeves.

Then, when the segment of line (a) (a') is slanted by $\alpha$ against a perpendicular line as shown in FIG. 10 (Y), a bolt 11 should be turned reversely so as to make cover 10 of said bearing press tightly the worm gear 7 for fixation thereof to said shaft.

In such a manner as above-mentioned, the adjusting operation for $\alpha$ is accomplished.

Next, in order to achieve the adjusting operation for $\beta$, the casing 13 is loosened to be free from said shaft by means of loosening the collar 17 which is fixedly screwed into said casing. Thereafter a worm 15 is rotated by means of a handle 14 and as the result, said casing itself turns around a worm gear 16 together with said worm 15, since said worm gear 16 is fixed to said shaft 1, which is in turn supported non-rotatably by a bearing 2.

Thereby, a bush 3 which is coupled with a coupling tube 18 fixed to said casing and other bushes 3 which are connected therewith like one unit by toothed coupling tubes 19 rotate simultaneously around the shaft 1.

On the other hand, a rubber roll 6 covers the sleeves 5 wherein said bushes are disposed through the medium of a ball bearings 4.

Accordingly, the center of said rubber roll is deviated so that the segment of line (a') (b) is slanted by $\beta$ against the line (a) (a').

After a desired deviation by $\beta$ is obtained, the rotation of the handle 14 should be stopped and the collar 17 should be fitted fixedly to said worm gear 16 by screwing said collar into said casing, and the shaft 1 fixed thereby.

Thus, the adjusting operation for $\beta$ is finished up after all.

In addition, it should be noted that, since the eccentricity of the bushes are successively increased toward the midpoint of the shaft, an adjusted amount of the altitude of the chord is successively increased toward the midpoint.

A still further description will be made regarding the second preferred embodiment; but the description is mainly concerned to a left-half portion thereof with reference to FIGS. 6 to 10.

An adjustment for $\alpha$ can be accomplished through the successive steps of releasing the covers 10,10' of the bearings 2,2' from securing of the worm gears 7,7' by means of unfastening the bolts 11,11' of said bearings, and rotating the handles 9,9' so as to rotate the worms 8,8' and the worm gears 7,7' to engage with said worms and thereby cause a simultaneous rotation of a central shaft 1 fixedly connected with said worm gears, the adjusting means 12,12' fixedly connected with said shaft, the teethed coupling tubes 18,18' fixedly fitted to the casing of said adjusting means, the bushes 3 connected with said coupling tubes together with other bushes 3' connected with said bushes through the medium of the teethed coupling tubes 19,19' just like one unit, the sleeves 5,5' wherein said bushes are disposed through the medium of the ball bearings 4,4' and a rubber roll 6 covering said sleeves.

When the segment of line (a) (a') is slanted by $\alpha$ against a perpendicular line as shown in FIG. 10 (Y), said bolts 11,11' are turned reversely so as to make the covers 10,10' of said bearings 2,2' press tightly said worm gears 7,7' for fixation thereof toward said shaft 1.

In such a manner as above-mentioned, the adjusting operation for $\alpha$ is completed.

Next, in order to accomplish an adjustment for $\beta$, the casing 13 is loosened to get free from said shaft by means of loosening a collar 17 which is fixedly screwed into said casing, and thereafter a worm 15 is rotated by means of a handle 14.

As the result, said casing turns around the worm gear 16 by itself together with said worm 15, since said worm gear is fixed not-rotatably to said shaft 1 which is in turn supported by a bearing 2 not-rotatably also.

Thereby, a bush 3, which is coupled with a teethed coupling tube 18 fixed to said casing and other bushes 3, which are connected therewith just like one unit by a teethed coupling tubes 19 are led to rotate simultaneously around the shaft.

On the other hand, a rubber roll 6 covers over a sleeve 5, wherein said bushes 3 is disposed through the medium of a ball bearing 4.

Accordingly, the center of said rubber roll is deviated so that the segment of line (a') (b) is slanted by $\beta$ against the line (a) (a'). After a deviation by $\beta$ is obtained, the rotation of the handle 14 should be stopped and the collar 17 should be fitted fixedly to said worm gear 16 by screwing said collar into said casing and thereby shaft 1 also fixed.

Thus, the adjustment for $\beta$ is accomplished after all.

When the left side group of bush rotating around the shaft, any bush in the right side group never rotates accordingly because of disposition of a thrust bearing at the center.

In order to make adjustment of the right side bushes, a means disposed on the right half just similarly with the left side one can be operated in a similar manner with the left side.

For this reason, a detailed description is omitted for it.

Furthermore, it should be noted that, in case of need, both group of bushes are preferably rotated at the same time.

What we claim is:

1. An adjustable curvature roll assembly, comprising:
    an elongated arc-shaped shaft and first and second bearing means supporting said shaft at axially spaced locations which are a substantial distance apart;
    disclike means rotatably supported on said shaft at a location spaced between said first and second bearing means, said disclike means being eccentrically positioned relative to the longitudinally extending axis of said shaft;
    a hollow cylinderlike roll positioned in surrounding relationship to and rotatably supported on said disclike means;
    first means coacting between said shaft and said disclike means for enabling said disclike means to be angularly adjusted relative to said shaft and for enabling said disclike means to be fixedly and nonrotatably connected to said shaft in a selected angular orientation; and
    second means coacting between said shaft and one of said bearings means for enabling said arc-shaped shaft to be angularly rotated relative to said one bearing means through a selected angle and for enabling said shaft to be fixedly and nonrotatably secured to said one bearing means in a selected angular orientation.

2. A roll assembly according to claim 1, wherein said disclike means includes a plurality of disclike members rotatably supported on said shaft in axially spaced relationship therealong, the eccentricity of said disclike members successively increasing in a direction extending axially from the bearing means toward the midpoint of the shaft, and means nonrotatably interconnecting said plurality of disclike members.

3. A roll assembly according to claim 2, further including a plurality of sleeves with each sleeve being disposed in surrounding relationship and rotatably supported on a respective one of said disclike members, and said roll comprising an elongated rubber roll extending axially of and covering said plurality of sleeves.

4. A roll assembly according to claim 3, wherein the means nonrotatably interconnecting the plurality of disclike members includes a plurality of coupling tubes rotatably disposed on said shaft and extending axially between and nonrotatably coupled to adjacent disclike members.

5. A roll assembly according to claim 4, wherein said first means is supported on said shaft adjacent one axial end of said rubber roll, said first means being normally fixedly and nonrotatably secured to said shaft and including means for releasing same from said shaft to enable relative rotation therebetween, and further including a coupling sleeve non-rotatably connected between said latter-mentioned means and the axially adjacent disclike member.

6. A roll assembly according to claim 1, wherein said first means comprises a casing rotatably mounted on said shaft and disposed adjacent one axial end of said roll, a worm gear disposed within said casing and nonrotatably fixed to said shaft, a manually rotatable worm rotatably supported on said casing and disposed in meshing engagement with said worm gear, and handle means disposed exteriorly of said casing and non-rotatably connected to said worm for rotating same.

7. A roll assembly according to claim 2, wherein said plurality of disclike members includes a first plurality of eccentric members rotatably supported on said shaft in the region between one end of said roll and the midpoint of said shaft, and a second plurality of eccentric members rotatably supported on said shaft in the region between the other axial end of said roll and the midpoint of said shaft, the eccentricity of the individual eccentric members of said first and second pluralities successively increasing in a direction from the axial end of said roll toward the midpoint of said shaft;

first coupling means extending axially between and non-rotatably interconnecting the individual eccentric members of said first plurality, and second coupling means extending between and non-rotatably interconnecting the eccentric members of said second plurality;

thrust bearing means located adjacent the midpoint of said shaft and disposed between the first and second pluralities of eccentric members for permitting relative rotation therebetween; and said first means including first and second adjustment means disposed adjacent the opposite axial ends of said roll, said first and second adjustment means respectively coacting with said first and second pluralities of eccentric members for enabling rotation of same relative to said shaft. for enabling rotation of same relative to said shaft.

* * * * *